May 1, 1934.  C. A. ROSS  1,956,775
VALVE
Filed Feb. 13, 1930   2 Sheets-Sheet 1
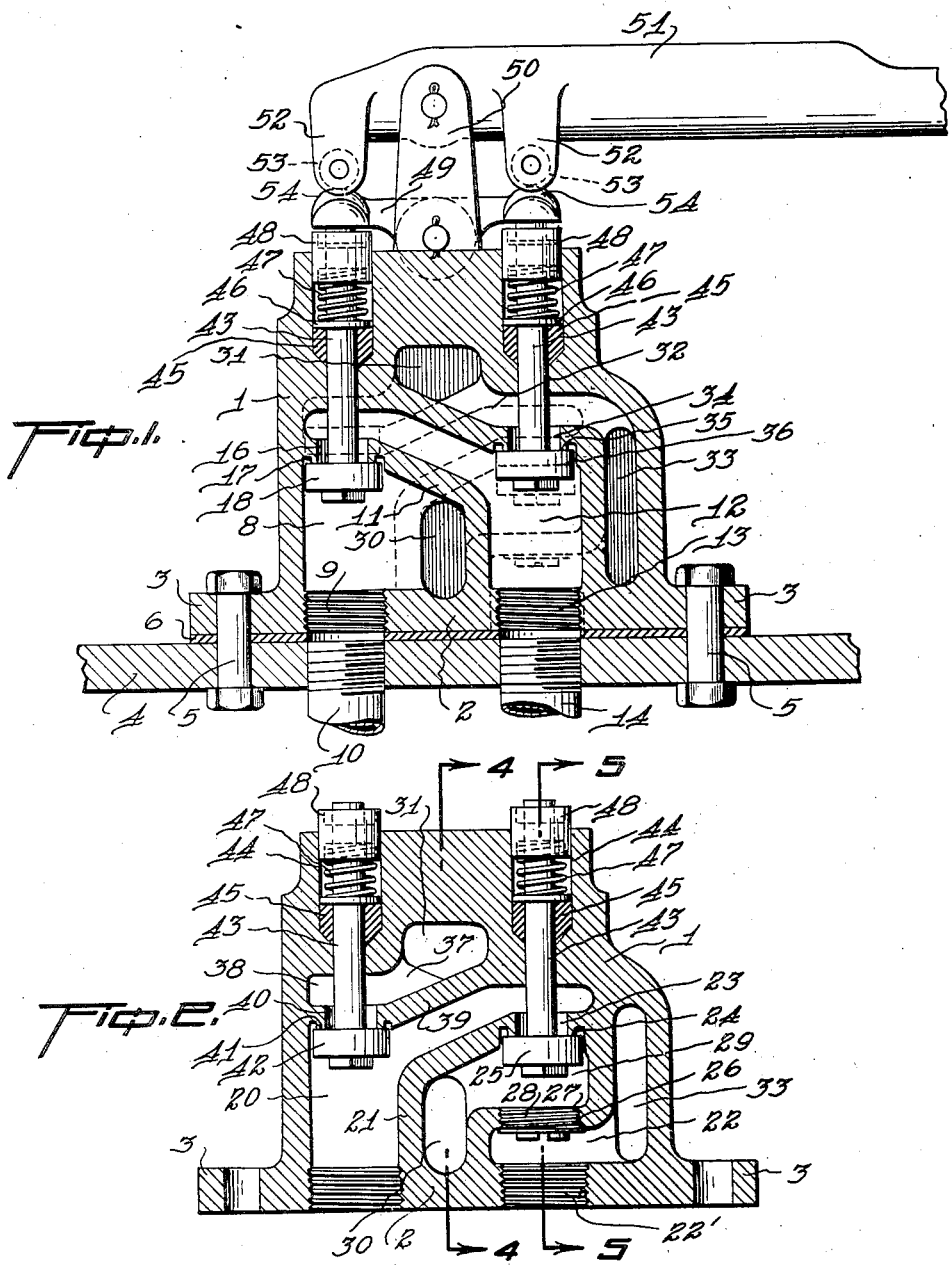
INVENTOR
*Charles A. Ross*
BY
*Berthel & Berthel*
ATTORNEYS May 1, 1934.   C. A. ROSS   1,956,775
VALVE
Filed Feb. 13, 1930   2 Sheets-Sheet 2
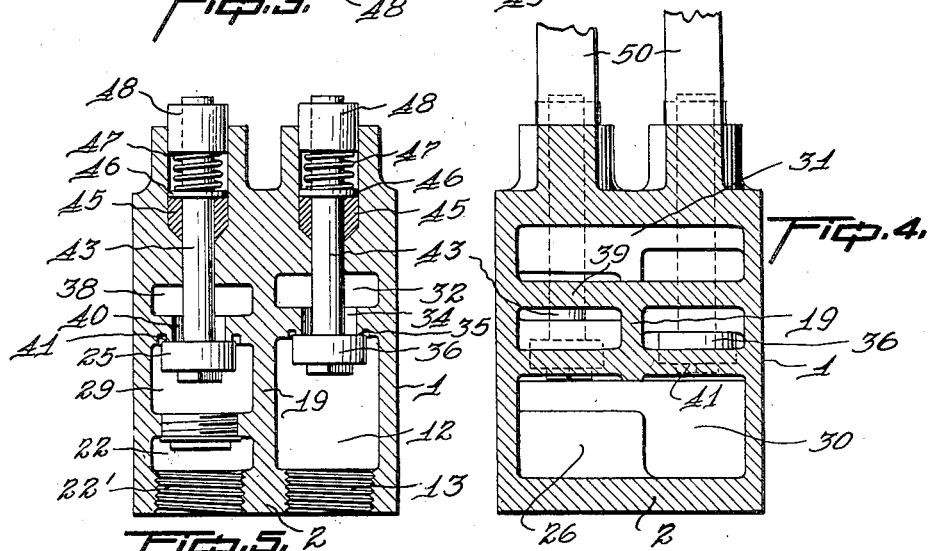
INVENTOR
Charles A. Ross
BY
ATTORNEYS Patented May 1, 1934

1,956,775

UNITED STATES PATENT OFFICE 1,956,775

VALVE

Charles A. Ross, Detroit, Mich.

Application February 13, 1930, Serial No. 428,026

3 Claims. (Cl. 277—20)

The present invention pertains to a novel valve and has special reference to that class commonly known as "two-way" valves, this class of valves being advantageously employed to control fluids and liquids under pressure, more especially air under pressure supplied by an air compressor or reservoir and adapted to be utilized as a motive power, for instance in a cylinder for moving a piston therein to accomplish work.

Conventional valves pertaining to the above class require considerable piping, constant attention during an operation, and due to the piping arrangement and the intricate and expensive parts and valve body, require almost continual packing to remain serviceable. Therefore, it is the primary object of the present invention to devise a valve of the above class that will be positive and reliable in its action, free from injury by ordinary use, easy to maintain tight against leakage, simple to operate, and comparatively inexpensive to manufacture.

Another object of the present invention is to devise a valve having a one piece valve body provided with an intake, exhaust and atmospheric ports, interconnected by channels and chambers in a manner permitting the valve body being cast and with little machining placed in condition for valves and connections.

Another object of the present invention is to devise a valve in which there is co-operation between the packing means for the valves and a valve guiding actuating means which permits the latter to actuate or increase the packing proclivities of the former. This is brought about by using spring pressed glands or packing members in the stuffing boxes through which the reciprocable valve rods or stems extend, the valve stems being provided with guiding members engaging in the upper portions of the stuffing boxes, the springs engaging the guiding members so that when the valve rods are actuated to open the valves the normally compressed springs between the glands and the guiding members are further compressed, thereby insuring a tighter packing when the valves are opened than when closed, the closed valvular condition more or less preventing leakage about the valve rods or stems. Since the packing means is automatically stressed during the charging of a cylinder, there is no danger of a cylinder being but partially charged due to leakage at the valve rods, and in addition there is practically no danger of a leak when the valves are seated, due to the fact that the means which presses against the packing gland is also assisted by the air pressure in drawing the valve head tight upon its seat.

A still further object of the present invention is to devise a valve in which the previously mentioned operating means includes a walking beam by which a plurality of valve rods may be depressed, and an oscillatory operating lever by which the valve rods may be selectively operated. This construction permits the valve rods to be disposed in sets and the relation between the walking beam and its operating lever is such that either set of valves may be positively operated and held in an open position without any danger of the valves closing or moving due to air pressure or the pressure of the springs which act upon the packing glands in a manner tending to seat the valves. This is brought about by a defined action of the operating lever relative to the walking beam, resulting from the air pressure and the pressure of the springs forcing upwardly in the valve stems, and more particularly by the shape of the walking beam, it being shaped to automatically and positively hold the operating lever in a set position until intentionally and manually readjusted. This feature in its broadest aspect involves two fulcrumed members, one actuated by the other, to assume angular relation with pressure against the actuated member holding the other member in its set position.

With the above and other ends in view, the invention consists in the matters hereinafter set forth and more particularly pointed out in the appended claims, reference being had to the accompanying drawings, in which Figure 1 is a cross sectional view through the valve body on a plane indicated by the line 1—1 of Fig. 3;

Fig. 2 is a cross sectional view on the line 2—2 of Fig. 3;

Fig. 3 is a top plan view of the present valve with the operating lever and walking beam removed;

Fig. 4 is a transverse cross sectional view through the body of the valve, taken on the line 4—4 of Fig. 2;

Fig. 5 is a transverse cross sectional view taken on the line 5—5 of Fig. 2; and Fig. 6 is a diagrammatic view illustrating the chambers or passages formed in the valve body and showing the circulation of the fluid therein, the valve being associated with a cylinder in order to assist in an understanding of one of its uses and operations.

Like characters of reference are employed throughout to designate the corresponding parts.

The valve comprises a substantially rectangular body 1 having a base 2 provided with lateral apertured lugs 3 so that the valve body may be secured to a suitable support in order to permit the valve to be mounted upon a table 4 by means of bolts 5, a gasket 6 being interposed between the valve body and the table. In this manner it becomes possible to have the piping necessary for the work to be controlled by the valve mounted in the table so that it is not necessary to disturb the piping in order to remove the valve to replace or repair the same.

The interior of the valve body is partitioned to form various chambers, passages and ports, the arrangement of which, accompanied with the valve arrangement and construction forms the important part of the present invention.

The intake chamber 8 has a port 9 which registers with the intake or supply pipe 10 having its opposite end connected to a suitable pressure supply. A partition 11 is provided to separate the intake chamber from the outlet chamber 12 having the port 13 registering with the pipe 14 which leads to the cylinder 15 in which fluid pressure is to be utilized as a source of power. The partition 11 is provided with a port 16 having a valve seat 17 upon which the valve 18 is adapted to seat.

In the present device there are four valves similar to the above mentioned valve 18 and in order to avoid confusion in the description of the inner passages and ports it is deemed advisable to defer the minute description of the valves to a later part of the description.

The above described chambers 8 and 12 are on the plane indicated by the line 1—1 in Figure 3 and directly behind them on the plane indicated by the line 2—2 in the same figure are formed more chambers which are separated from the described chambers by a longitudinally extending central wall 19. The latter chambers comprise an outlet chamber 20 which registers with a pipe 21' (see Fig. 6) when the valve body is mounted upon the table 4. A partition 21 is provided to separate the chamber 20 from the inlet chamber 29 and the partition has a port 23 formed with a valve seat 24 upon which the valve head 25 is adapted to seat.

The exhaust chamber 22 is formed by a partition 26 having a bore 27 provided with screw threads to receive the plug 28, thereby forming a separate chamber 29 which is connected to the intake chamber 8 by the passage 30, a port 22' being provided to connect the exhaust chamber to the atmosphere. In this manner it becomes apparent that the air pressure coming in the line 10 is always present in the chambers 8 and 29 and is prevented from passing through the bores 16 and 23 by the valves 18 and 25, these two valves therefore becoming the intake control valves.

A passage 31 extends through the central partition 19 and is connected by the passage 32 to the chamber 33 which connects with the exhaust chamber 22. A port 34 is provided to connect the chamber 12 to the passage 32 and is formed with a valve seat 35 upon which seats the valve 36. A passage 37 is provided to connect a small chamber 38 with the passage 31, the passage 37 and chamber 38 being formed by providing a partition 39 having a port 40 formed with a valve seat 41 to accommodate the valve 42.

The valve arrangement can be readily understood with reference to Fig. 3, there being four provided in the described embodiment of the present invention, each valve being identical in construction and comprising a stem 43 which extends upwardly through suitable bores formed in the inner partitions and through the packing boxes 44 in which are received suitable packing glands 45. A washer 46 surrounds the stem 43 and rests upon the top of the packing glands and resiliently exerts pressure thereon due to the springs 47 which surround the stem and are compressed against the washer by means of the retaining members 48. The retaining members are held upon the upper end of the stems by means of the cotter pins 48' and are formed of such length that they extend a sufficient distance into the packing boxes whereby they serve as centering devices for the valve stems and assist in maintaining the valves flat upon their seats. The retaining members also serve to prevent any tendency of the valve stems to move sideways when the actuating pressure is exerted thereupon in a manner becoming clear as the description progresses.

The valve actuating mechanism comprises a walking beam 49 which is pivotally mounted between upwardly extending arms 50 formed on the valve body, the walking beam being in contact with the upper ends of the valve stems 43. Pivotally mounted between the upper ends of the arms 50 is mounted an operating lever 51 having arms 52 extending downwardly on opposite sides of its pivot and having rollers 53 mounted thereon to engage the walking beam. The rollers 53 engage upon rounded knobs or abutments 54 on the upper part of the walking beam and therefore when the lever 51 is forced downwardly or upwardly respectively two valves are forced downwardly by each movement, the direction of movement being governed by which pair of valves it is necessary to force off their seats.

When the lever is at the limit of its downward or upward movement the rollers 53 butt against the side of the abutments 54 in a manner positively locking the lever from movement, and from the foregoing description it will be observed that there is a set of valves at each end of the valve body 1 and that by raising or lowering the operating lever each set of valves may be opened. Assuming that the operating lever is moved upwardly the walking beam 49 is rocked to depress the intake valve 18 and the valve 42. When in this position, air passes into the intake chamber 8, through the port 16 into the chamber 12 and the pipe 14 leads it to the cylinder 15. To move the piston the air must be released from its opposite side and therefore the air therein goes back through the line 21', into the chamber 20, through the port 40 to the passage 31, the passage 32 to the chamber 33, the chamber 22 and out the port 22' to the atmosphere.

When it is desired to actuate the piston in the opposite direction, the walking beam is rocked to depress the valves 25 and 36. In this case the air under pressure comes in the pipe 10 and from the chamber 8 through the passage 30 to the chamber 29 from which it passes through the port 23 to the chamber 20 and then through the line 21' to the cylinder 15. The air on the opposite side of the piston backs up the pipe 14 to the chamber 12 from which it passes through the port 34 to the chamber 33, then to the chamber 22 and out the atmosphere port 22'.

The construction above described is characterized in that it reduces the amount of piping necessary for valves operating pistons in opposite directions inasmuch as the present device employs only a single inlet port which is common to both sets of valves and it employs a single exhaust port which is common to both sets of valves.

Although a specific embodiment of the present invention has been illustrated and described, it is to be understood that various changes may be made in the details of construction without departing from the spirit of the invention, and such changes are contemplated.

What I claim is:—

1. A valve of the character described comprising a body of substantially rectangular cross section, an intake chamber entering said body from the bottom and adjacent one corner thereof, a chamber entering said body from the bottom and in the corner diagonally opposite said intake chamber, a partition dividing said last named chamber into two compartments, a passage connecting said intake chamber to the compartment above said partition, an outlet chamber entering from the bottom of a remaining corner of said body and shaped in a manner to lie directly above said intake chamber, a valve controlled passage between said intake chamber and said outlet chamber, a second outlet chamber entering said body from the bottom in the corner diagonally opposite said outlet chamber and shaped to lie directly above said compartment above said partition, a valve controlled passage between the compartment above said partition and said second outlet chamber, a transverse passage in said body above said outlet chambers and connected to the compartment beneath said partition, and valve controlled passages between said transverse passages and said outlet chambers.

2. A valve of the character described comprising a body of substantially rectangular cross section, an intake chamber entering said body from the bottom and adjacent one corner thereof, a chamber entering said body from the bottom and in the corner diagonally opposite said intake chamber, a partition dividing said last named chamber into two compartments, a passage connecting said intake chamber to the compartment above said partition, an outlet chamber entering from the bottom adjacent one of the remaining corners of said body and shaped in a manner to lie directly above said intake chamber, a valve controlled passage between said intake chamber and said outlet chamber, a second outlet chamber entering said body from the bottom in the corner diagonally opposite said outlet chamber and shaped to lie directly above said compartment above said partition, a valve controlled passage therebetween, a transverse passage in said body above said outlet chambers and connected to the compartment beneath said partition, valve controlled passages between said transverse passage and said outlet chambers, and self locking operating means for opening the valves in said passages in sets.

3. A valve of the character described comprising a body of substantially rectangular cross section, an intake chamber entering said body from the bottom and adjacent one corner thereof, a chamber entering said body from the bottom and in the corner diagonally opposite said intake chamber, a partition dividing said last named chamber into two compartments, a passage connecting said intake chamber to the compartment above said partition, an outlet chamber entering from the bottom adjacent one of the remaining corners of said body and shaped in a manner to lie directly above said intake chamber, a valve controlled passage between said intake chamber and said outlet chamber, a second outlet chamber entering said body from the bottom in the corner diagonally opposite said outlet chamber and shaped to lie directly above said compartment above said partition, a valve controlled passage therebetween, a transverse passage in said body above said outlet chambers and connected to the compartment beneath said partition, valve controlled passages between said transverse passage and said outlet chambers, self locking operating means for opening the valves in said passages in sets, said valve operating means comprising a walking beam having end abutments, and rocking means for engaging said walking beam and for constantly engaging said abutments and assuming an angular relation thereto whereby said walking beam and its rocking means are positively held with said valves in a set position.

CHARLES A. ROSS.